Patented Jan. 20, 1942

2,270,779

UNITED STATES PATENT OFFICE 2,270,779

PROCESS OF OXIDIZING A HYDROCARBON

Ernst Berl, Pittsburgh, Pa., assignor to Berl Chemical Corporation, a corporation of Delaware No Drawing. Application February 7, 1938, Serial No. 189,277. In Great Britain February 25, 1937

5 Claims. (Cl. 260—603)

This invention relates to oxidation processes and has for its object to provide improved control of the progress of the oxidation.

Catalytic reactions for the oxidation of organic substances are employed to an increasing extent in the manufacture of important intermediate and ultimate products. The difficulty of carrying out such reactions in which a large evolution of heat frequently takes place, lies in the fact that the chemical process readily goes too far, and, instead of the desired substances, the final products of any combustion, namely carbon dioxide, carbon monoxide, and water, are formed. The reaction of transformable organic substances with oxygen may result in the simple addition of oxygen, but it may also go so far as to result in the conversion into water of a more or less large proportion of the hydrogen combined in the molecule, while the carbon is converted to carbonic acid,—as for example in the production of phthalic acid anhydride from naphthalene. Moreover, all such reactions must take place outside the explosion limits and in general below the lower explosion limit, thereby necessitating that a considerable excess of air or oxygen must be present. This again may increase the danger of the reaction going too far.

As a result of investigation and research the present invention avoids the difficulties and drawbacks hitherto encountered in oxidation processes by carrying out the oxidation (with air or oxygen) in the presence of small amounts of so-called "anti-knock" materials i. e. substances known to confer anti-detonating properties when added to fuels used in internal combustion engines.

Suitable anti-detonating agents are aromatic hydrocarbons such as benzene or xylene, chlorinated aliphatic hydrocarbons such as ethylene dichloride or dibromide, aliphatic alcohols such as ethyl alcohol, ethers such as ethyl ether, halogens such as iodine vapour, aromatic bases such as aniline, and organo-metallic compounds. Alkyl compounds of heavy metals such as lead tetra-ethyl, also compounds of heavy metals with carbon monoxide, such as iron penta-carbonyl, have proved particularly suitable. In addition to such anti-detonating agents finely dispersed metals such as lead and iron may be employed, preferably by incorporation with the material to be oxidised.

The addition of the above mentioned substances facilitates the attainment and retention of the desired reaction temperature and prevents the oxidation proceeding to such an extent as to produce worthless products.

For any particular oxidising reaction, the temperature and pressure and kind of catalyst known to be appropriate are observed. As to the quantity of anti-detonating agent employed this varies with the nature of the compound. For example organo-metallic compounds and halogenated hydrocarbons produce the desired result when added in very small quantities, whereas aromatic hydrocarbons such as benzene, and aliphatic alcohols such as ethyl alcohol, require to be used in relatively large amounts to produce the same effect. Any amount not exceeding about 0.5 per cent of the total volume of reactants may be employed but preferably the amount added is from 0.005% to 0.2%. The amount of agent suitable for any particular reaction will depend to some extent on the anti-detonating activity of the selected agent and as will be readily understood it will also depend on whether the particular reaction is effected in the presence or absence of a catalyst and on the activity of the catalyst if used.

It will be understood that if a catalyst is employed the anti-detonating substance added should be so selected as not to poison or destroy the activity of the catalyst; for instance in the case of using a silver catalyst the use of an organo-metallic compound such as tetra-ethyl lead may be undesirable.

The following examples serve to illustrate the practising of the invention, but are not to be regarded as limitative:

Example 1

Methane is mixed with air and a small amount of iron penta-carbonyl is incorporated. The resulting mixture is passed at any desired speed over finely divided iron oxide as catalyst at a suitable temperature under normal or increased pressure. By an appropriate control of the working conditions the oxidation of the methane results in a considerable yield of formaldehyde.

Example 2

By employing cracked gases instead of the methane of Example 1 the process then results in the production of valuable oxidation products.

Example 3

Naphthalene is oxidised in the known manner by means of oxygen but incorporating iron penta-carbonyl as anti-detonating agent and a good yield of phthalic anhydride is thereby obtained.

What I claim is:

1. A process for carrying out a controlled partial oxidation of an exothermically oxidizable hydrocarbon compound in the vapor phase by means of a gas comprising free molecular oxygen at the temperature and pressure required for the oxidation which comprises carrying out said oxidation in the presence of an anti-knock reagent and of a metal oxidation-catalyst, said catalyst not being substantially poisoned by said anti-knock reagent.

2. A process for carrying out a controlled partial oxidation of an exothermically oxidizable hydrocarbon compound in the vapor phase by means of a gas comprising free molecular oxygen at the temperature and pressure required for the oxidation which comprises carrying out said oxidation in the presence of iron penta-carbonyl and of a metal-oxidation-catalyst, said catalyst not being substantially poisoned by iron penta-carbonyl.

3. A process for carrying out a controlled partial oxidation of an exothermically oxidizable hydrocarbon compound in the vapor phase by means of a gas comprising free molecular oxygen at the temperature and pressure required for the oxidation which comprises carrying out said oxidation in the presence of lead tetra-ethyl and of a metal oxidation-catalyst, said satalyst not being substantially poisoned by lead tetra-ethyl.

4. A process for carrying out a controlled partial oxidation of an exothermically oxidizable hydrocarbon compound in the vapor phase by means of a gas comprising free molecular oxygen at the temperature and pressure required for the oxidation which comprises carrying out said oxidation in the presence of iodine vapor and of a metal oxidation-catalyst, said catalyst not being substantially poisoned by iodine vapor.

5. A process for carrying out a controlled partial oxidation of an exothermically oxidizable hydrocarbon compound in the vapor phase by means of oxygen at the temperature and pressure required for the oxidation in order to secure valuable intermediate products which comprises carying out said oxidation in the presence of an anti-knock substance, said anti-knock substance constituting from .005% to .5% of the total volume of the reactants, and of a metal oxidation catalyst, said catalyst not being substantially poisoned by said anti-knock substance.

ERNST BERL.